(12) United States Patent
Kasajima et al.

(10) Patent No.: US 6,775,107 B2
(45) Date of Patent: Aug. 10, 2004

(54) HEAD GIMBAL ASSEMBLY WITH PRECISE POSITIONING ACTUATOR FOR HEAD ELEMENT

(75) Inventors: Tamon Kasajima, Kwai Chung (HK); Masashi Shiraishi, Kwai Chung (HK)

(73) Assignee: SAE Magnetics (H.K.) Ltd., Kwai Chung (HK)

( * ) Notice: Subject to any disclaimer, the term of this patent is extended or adjusted under 35 U.S.C. 154(b) by 150 days.

(21) Appl. No.: 10/125,344

(22) Filed: Apr. 19, 2002

(65) Prior Publication Data

US 2002/0154447 A1 Oct. 24, 2002

(30) Foreign Application Priority Data

Apr. 23, 2001 (JP) ...................................... 2001-124240

(51) Int. Cl.[7] .............................................. G11B 5/56
(52) U.S. Cl. .............................. 360/294.4; 360/245.3
(58) Field of Search ........................... 360/294.4, 245.3, 360/294.1, 294.3

(56) References Cited

U.S. PATENT DOCUMENTS

| | | | |
|---|---|---|---|
| 5,745,319 A | | 4/1998 | Takekado et al. ........ 360/78.05 |
| 6,246,552 B1 | * | 6/2001 | Soeno et al. ............. 360/294.4 |
| 6,297,936 B1 | * | 10/2001 | Kant et al. ............... 360/294.4 |
| 6,320,730 B1 | * | 11/2001 | Stefansky et al. ........ 360/294.4 |
| 6,381,104 B1 | * | 4/2002 | Soeno et al. ............. 360/294.4 |
| 6,538,854 B2 | * | 3/2003 | Koganezawa et al. ... 360/294.4 |
| 2001/0046107 A1 | * | 11/2001 | Irie et al. ................. 360/294.4 |
| 2002/0036870 A1 | * | 3/2002 | Shiraishi et al. ......... 360/294.4 |
| 2002/0051326 A1 | * | 5/2002 | Shiraishi et al. ......... 360/294.4 |
| 2002/0141117 A1 | * | 10/2002 | Kasajima et al. ........ 360/294.4 |
| 2002/0154450 A1 | * | 10/2002 | Kasajima et al. ........ 360/294.4 |
| 2002/0176212 A1 | * | 11/2002 | Ota et al. ................. 360/294.4 |
| 2003/0147181 A1 | * | 8/2003 | Shiraishi et al. ......... 360/294.4 |

FOREIGN PATENT DOCUMENTS

JP          8-180623          7/1996

* cited by examiner

Primary Examiner—Jefferson Evans
(74) Attorney, Agent, or Firm—Burns, Doane, Swecker & Mathis, L.L.P.

(57) ABSTRACT

An HGA includes a head slider provided with at least one head element, a precise positioning actuator fixed to the head slider for precisely positioning the at least one head element, a flexure made of a metal plate member for supporting the actuator and a load beam fixed to and for supporting the flexure. The actuator includes a pair of movable arms each formed by a metal plate that is substantially in parallel with a side surface of the head slider. Top end sections of the pair of movable arms are capable of displacing in response to a drive signal applied to the actuator along a direction crossing planes of the metal plate. The flexure and the actuator are unitarily formed.

8 Claims, 6 Drawing Sheets

HEAD GIMBAL ASSEMBLY WITH PRECISE POSITIONING ACTUATOR FOR HEAD ELEMENT

FIELD OF THE INVENTION

The present invention relates to a head gimbal assembly (HGA) with a precise positioning actuator for a head element such as a thin-film magnetic head element or an optical head element.

DESCRIPTION OF THE RELATED ART

In a magnetic disk drive apparatus, thin-film magnetic head elements for writing magnetic information into and/or reading magnetic information from magnetic disks are in general formed on magnetic head sliders flying in operation above the rotating magnetic disks. The sliders are supported at top end sections of suspensions of HGAs, respectively.

Recently, recording and reproducing density along the radial direction or along the track width direction in the magnetic disk (track density) rapidly increase to satisfy the requirement for ever increasing data storage capacities and densities in today's magnetic disk drive apparatus. For advancing the track density, the position control of the magnetic head element with respect to the track in the magnetic disk by a voice coil motor (VCM) only has never presented enough accuracy.

In order to solve this problem, an additional actuator mechanism is mounted at a position nearer to the magnetic head slider than the VCM so as to perform fine precise positioning that cannot be realized by the VCM only. The techniques for realizing precise positioning of the magnetic head are described in for example U.S. Pat. No. 5,745,319 and Japanese patent publication No. 08180623 A.

As for a precise positioning actuator, there are various structures of actuator such as for example a load-beam structure actuator and a piggy-back structure actuator.

The load-beam structure actuator has two piezoelectric elements of PZT attached on a load beam of a suspension. These PZT elements are driven in a manner to support with each other to displace the load beam so as to perform fine precise positioning of a magnetic head slider mounted on the load beam.

The piggy-back structure actuator is formed by piezoelectric material of PZT in an I-character shape with one end section to be fixed to a suspension, the other end section to be fixed to a magnetic head slider and a pillar shaped movable arm connected between these end sections. The PZT is driven to perform fine precise positioning of the magnetic head slider directly attached to this actuator. On the suspension, stepwise stacked are the actuator and the magnetic head slider, namely, the actuator is caught between the suspension and the slider to form a stacked cantilever structure.

However, the aforementioned conventional precise positioning actuators had following various problems:

(1) Mechanical resonance was occurred at a relatively low frequency;
(2) Since the actuator as a whole consists of piezoelectric material such as PZT of a brittle material, shock resistance is very poor. Particularly, since in case of a piggy-back structure actuator, the actuator and the magnetic head slider are stacked to form a cantilever structure, a shock easily occurs with a moment and also shock resistance is extremely poor;
(3) Depending upon the size of the magnetic head slider, a travel of the magnetic head element during the precise positioning operation varies. Thus, it is difficult to obtain enough stroke;
(4) Handling at the time of an assembly of the HGA is very difficult;
(5) Particularly, in case of a piggy-back structure actuator, because of the stepwise stacked structure, a total thickness of the HGA around the magnetic head slider increases by the thickness of the actuator;
(6) In case of a piggy-back structure actuator, because of three-dimensional and complicated attachment structure, the handling at the time of an assembly of the HGA is extremely difficult and it is impossible to use a conventional HGA assembly equipment causing productivity to be very worse; and
(7) In order not to interfere with the movement of the piggy-back structure actuator, it is necessary to assemble with keeping a gap between the actuator and the magnetic head slider and also between the actuator and the suspension. However, forming of such gaps will more decrease the shock resistance and it is difficult to precisely keep the gaps constant. Particularly, since it is difficult to keep the suspension, the actuator and the magnetic head slider in parallel precisely, the head characteristics deteriorates.

To solve the aforementioned various problems, the inventors of this application had proposed an actuator provided with a pair of metal plate movable arms for fixing and catching a magnetic head slider in a space between the movable arms (Japanese Patent Application No. 2000-332255).

SUMMARY OF THE INVENTION

The present invention intends to provide an HGA using a metal actuator, which can be more easily fabricated. In other words, it is an object of the present invention to provide an HGA with a precise positioning actuator for a head element, whereby a manufacturing process of the HGA can be simplified.

According to the present invention, an HGA includes a head slider provided with at least one head element, a precise positioning actuator fixed to the head slider for precisely positioning the at least one head element, a flexure made of a metal plate member for supporting the actuator and a load beam fixed to and for supporting the flexure. The actuator includes a pair of movable arms each formed by a metal plate that is substantially in parallel with a side surface of the head slider. Top end sections of the pair of movable arms are capable of displacing in response to a drive signal applied to the actuator along a direction crossing planes of the metal plate. The flexure and the actuator are unitarily formed.

The frame of the actuator, made from a metal member and the flexure made from a metal member are unitarily formed by a metal plate. Therefore, no process for partially fixing the actuator to the tongue of the flexure is necessary resulting a manufacturing process of an HGA can be simplified. It should be noted that, according to the present invention, the actuator itself shares the function of the tongue of the flexure.

It is preferred that the actuator further includes a coupling section connected between the top end sections of the pair of movable arms and formed by a metal plate that is substantially in parallel with a one surface of the head slider, which one surface is opposite to an air bearing surface (ABS) of the head slider and fixed to the coupling section. Since the actuator is provided with a coupling section connected between the top end sections of the pair of movable arms and the head slider is to be fixed to this coupling section, fixing of the slider can be achieved with sufficient strength and a shock resistance against up-and-down movements can be greatly improved. Also, head sliders with different widths can be easily mounted to the actuator.

Further, the movable arms and the coupling section are mainly made from a metal plate, the weight of the whole actuator can be reduced and thus a mechanical resonance frequency of the actuator can be increased. Also, as a basic member of the arms is formed by the metal plate that is strong and light-weighted, a shock resistance of the movable arms that are particularly weaken for the shock can be greatly improved. Due to the usage of the metal plate provided with a high mechanical strength, treatment of the actuator during assembling of the HGA becomes very easy. By using the metal plate to form the main portion of the actuator, the flexibility on a design of the actuator will improve with the shape and/or size. Thus, it is enabled to design the actuator with a sufficient stroke. Furthermore, because the metal plate can be precisely machined, accuracy in size of the actuator itself can be greatly improved.

Also, since the head slider will be mounted in a space between the movable arms, the thickness of the HGA around the head slider does not increase even if the actuator is attached. Thus, no modifications in size of the disk drive apparatus due to the mounting of the actuator is necessary. In addition, since the head slider is caught in between the movable arms, the top end sections of the movable arms, which actually transfer the displacement to the slider, can be extended to always position at the top end of the slider. Thus, it is possible to provide a constant travel to the slider even if the size of the head slider changes, and therefore an enough stroke of the head at the precise positioning operation can be always obtained.

Because of a partial fixing of the head slider to the coupling section of the actuator, shape change in the ABS of the head slider (generation of crown or camber) can be prevented from occurring even if the adhesive deforms due to change in atmosphere temperature.

It is also preferred that the actuator further includes a base section formed by a metal plate that is in parallel with the coupling section, and that the pair of movable arms extend forward from the base section. As not only the movable arms and the coupling section but also the base section are made from a metal plate, the weight can be more reduced and a shock resistance can be more improved. Also, accuracy in size of the actuator itself can be greatly improved.

It is preferred that the base section of the actuator includes a strip and a projection protruded forward from the strip, a load being applied to the projection from the load beam. In this case, preferably, the projection has side edges each having an arc shaped section.

Since the actuator shares the function of the tongue of the flexure, in operation, a load is applied to the actuator from a dimple of the load beam. According to the invention, this load is received by the projection protruded forward from the base section. However, since the actuator and the flexure are unitarily formed, it is impossible to thicken the projection only. Therefore, to increase the rigidity of the projection, the frame of the actuator is roundly bent so that each of the side edges of the projection has an arc shaped section. As a result, the projection will hardly bend even if the load is applied from the load beam.

It is further preferred that the pair of movable arms, the coupling section, the base section and the projection of the actuator have a U-shaped section structure formed by bending a single metal plate. Since the main portion of the actuator is configured by bending a single metal plate, its fabrication becomes easy and a mechanically strong actuator can be provided.

It is preferred that each of the pair of movable arms consists of an arm member made of the metal plate, and a piezoelectric element formed or adhered on a side surface of the arm member. In this case, the piezoelectric element has a multi-layered structure or a single layer structure of a piezoelectric material layer and of an electrode layer. If the piezoelectric element is formed in the multi-layered structure, sufficient displacement will be obtained at low drive voltage and a horizontal shock resistance will be increased.

It is preferred that the metal plate is a stainless steel plate.

It is preferred that the at least one head element is at least one thin-film magnetic head element.

Further objects and advantages of the present invention will be apparent from the following description of the preferred embodiments of the invention as illustrated in the accompanying drawings.

DESCRIPTION OF THE PREFERRED EMBODIMENTS

Figure 1:
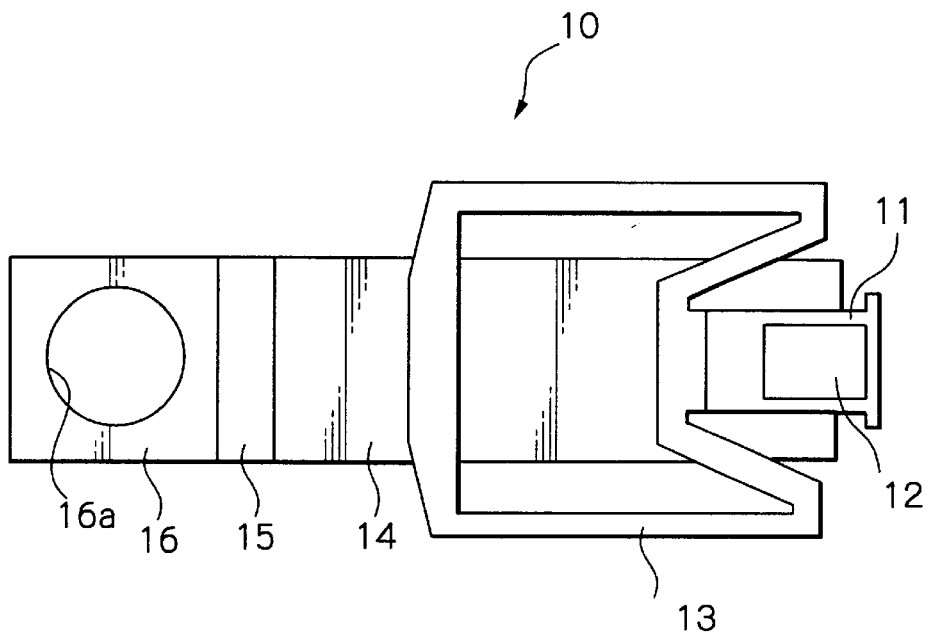
FIG. 1 is a plane view schematically illustrating the whole structure of an HGA in a preferred embodiment according to the present invention.
Figure 2:
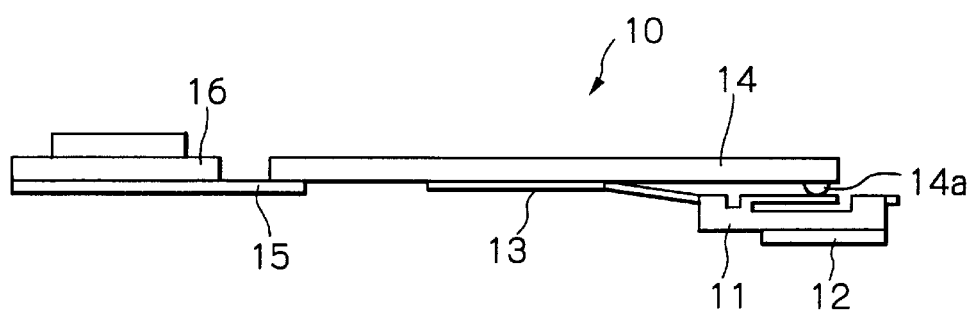
FIG. 2 is a side view of the HGA in the embodiment of FIG. 1.

FIG. 1 schematically illustrates the whole structure of an HGA in a preferred embodiment according to the present invention, and FIG. 2 is a side view of the HGA shown in FIG. 1.

As shown in these figures, the HGA 10 is substantially configured by a fine tracking actuator 11 for precise positioning of a thin-film magnetic head element, a magnetic head slider 12 provided with the thin-film magnetic head element and a surface that is opposite to its air bearing surface (ABS) and fixed to the actuator 11, a resilient flexure 13 united with the actuator 11, a load beam 14 fixed to for supporting the flexure 13, a resilient hinge 15, and a base plate 16 coupled to a rear end of the load beam 14 through the hinge 15.

The flexure 13 has elasticity for supporting flexibly the magnetic head slider 12 through the actuator 11 that is united with the flexure itself, and for applying a proper stiffness to the actuator 11 that is depressed by a load applying projection or a dimple 14a formed on the load beam 14 at its top end section. This flexure 13 is made of in this embodiment a stainless steel plate (for example SUS304TA) with a thickness of about 20 µm. The flexure 13 is fixed with the load beam 14 at a plurality of points by pinpoint welding.

The hinge 15 has elasticity providing, to the load beam 14, a force for pressing the magnetic head slider 12 toward the direction of a magnetic disk surface through the actuator 11 in operation. This hinge 15 is made of in this embodiment a stainless steel plate with a thickness of about 40 µm.

The load beam 14 is made of in this embodiment a stainless steel plate with a thickness of about 100 µm, and fixed to the hinge 15 at its rear end section. The fixing of the load beam 14 with the hinge 15 is performed by pinpoint welding at a plurality of points.

The base plate 16 is made of in this embodiment a stainless steel or iron plate with a thickness of about 150 µm, and fixed to the hinge 15 by welding. This base plate 16 is mounted in an HDD by attaching its attaching section 16a to a drive arm (not shown) of the HDD.

Figure 3:
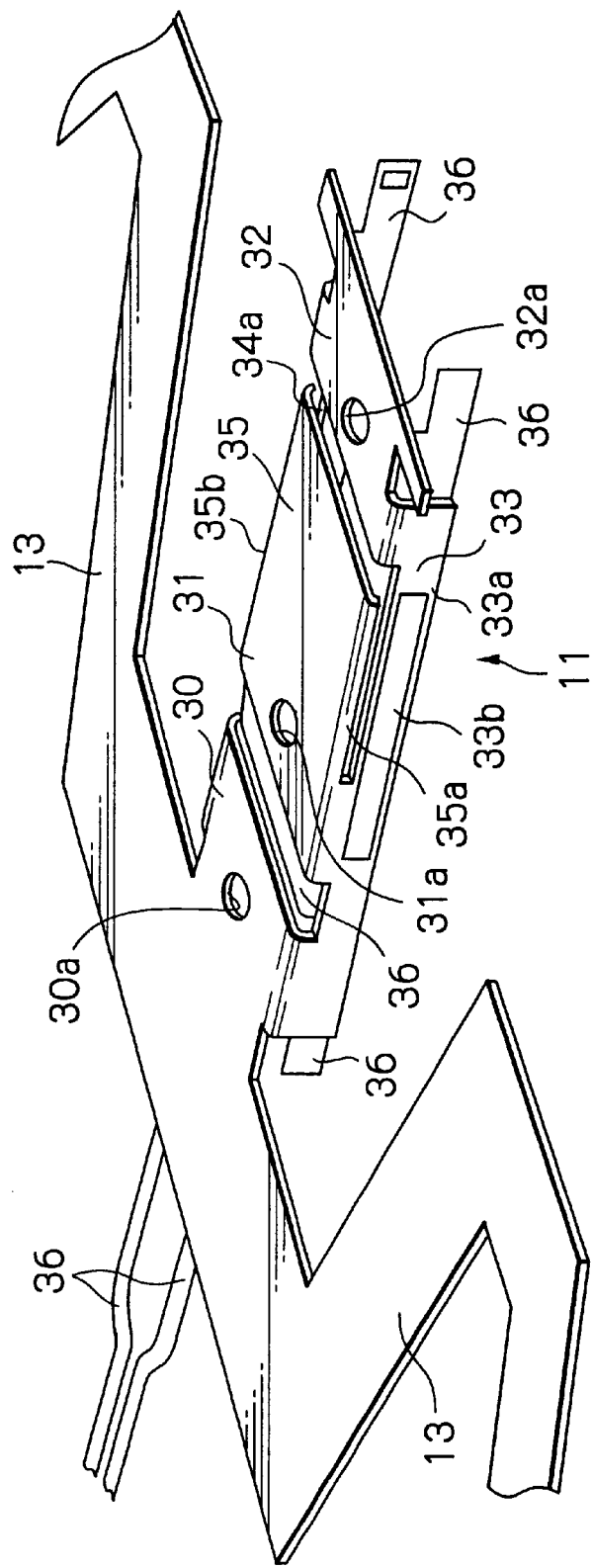
FIG. 3 is an oblique view illustrating a part of an actuator and a flexure of the HGA in the embodiment of FIG. 1.
Figure 4:
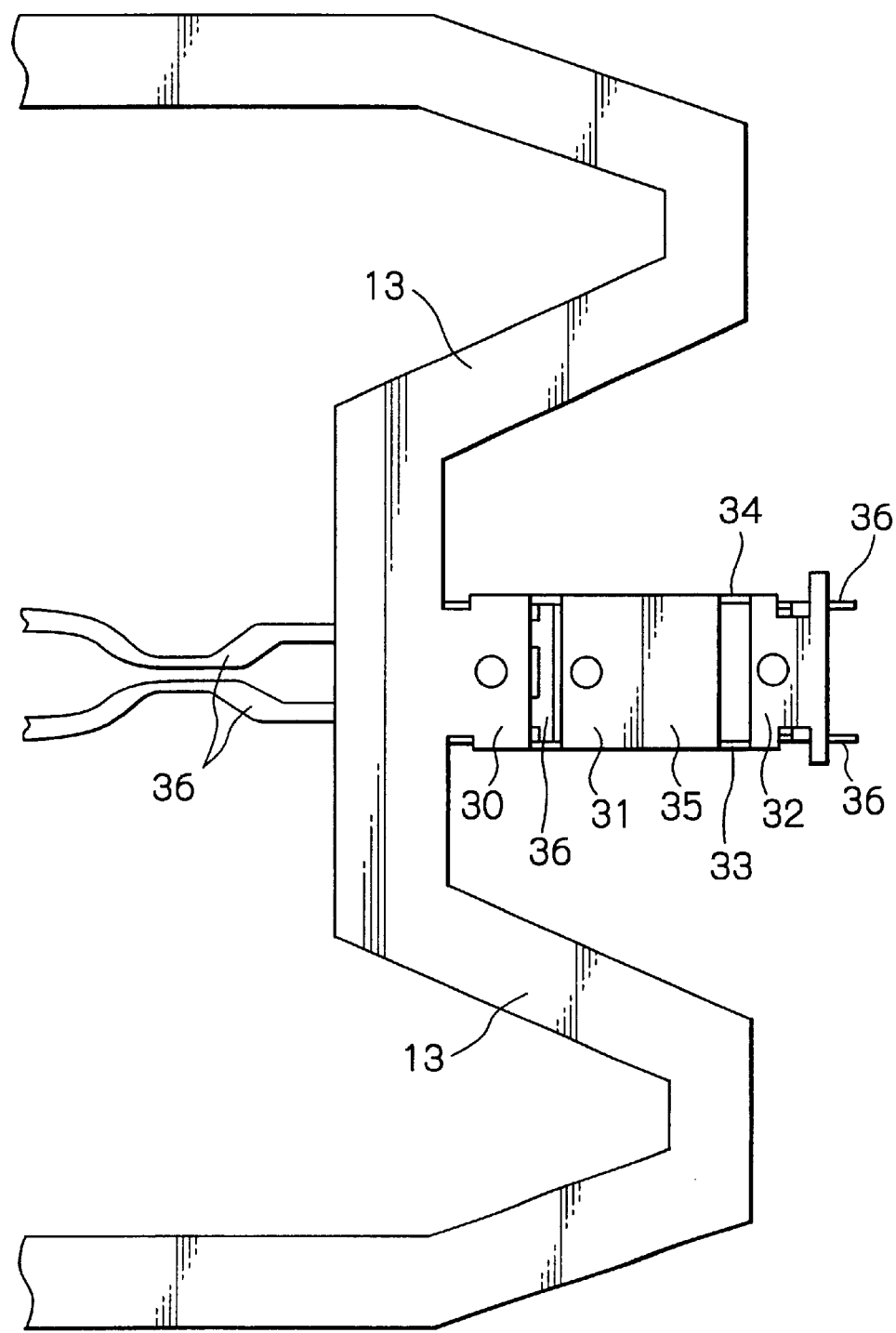
FIG. 4 is a plane view illustrating a part of an actuator and a flexure of the HGA in the embodiment of FIG. 1.
Figure 5:
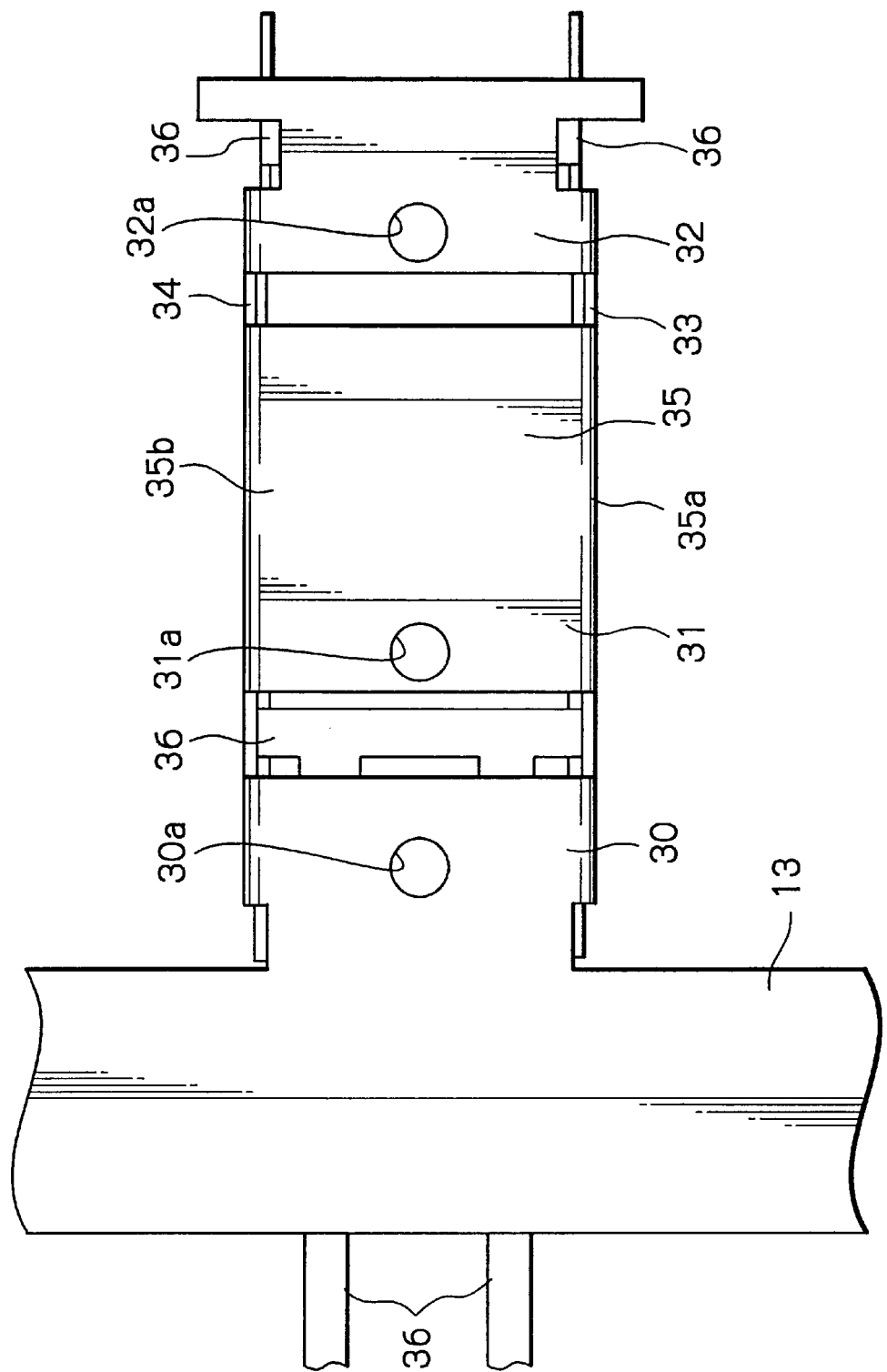
FIG. 5 is a plane view illustrating a part of an actuator and a flexure of the HGA in the embodiment of FIG. 1.
Figure 6:
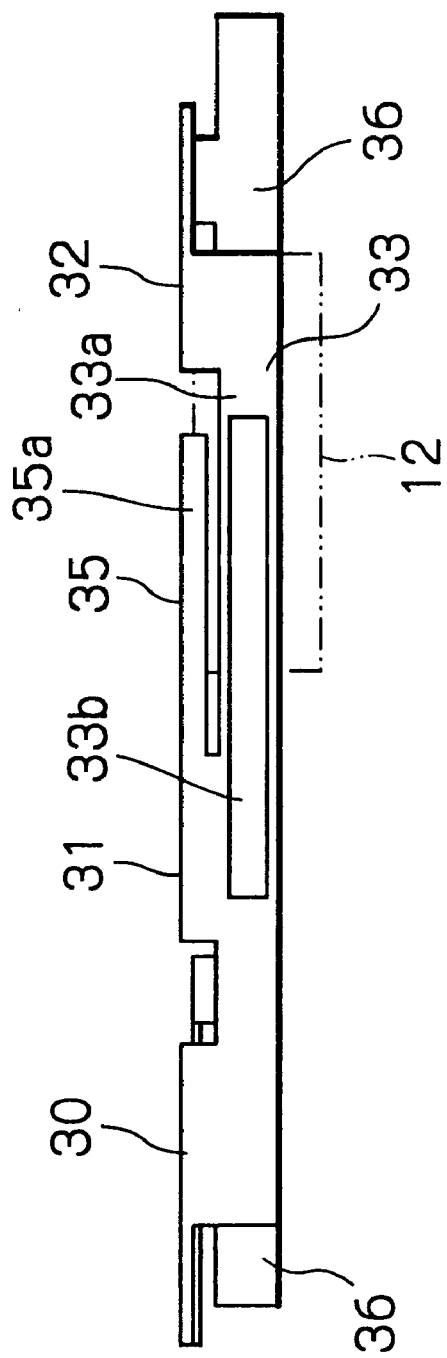
FIG. 6 is a side view illustrating in detail the actuator section of the HGA in the embodiment of FIG. 1.

FIG. 3 illustrates a part of an actuator and a flexure of the HGA in the embodiment of FIG. 1, FIGS. 4 and 5 illustrate parts of an actuator and a flexure of the HGA in this embodiment of FIG. 1, and FIG. 6 illustrates in detail the actuator section of the HGA in this embodiment.

As will be noted from these figures, the main portion (frame) of the actuator 11 and the flexure 13 in this embodiment are formed by cutting out a single metal plate member in a predetermined shape, and by bending a portion of the actuator into three dimensional shape. Namely, each flexure-actuator unitary member cut out in the predetermined shape is substantially perpendicularly bent along lines inside from the both side edges of a successive section 30 between the flexure and the actuator, of a strip-shaped base section 31 of the actuator and of a strip-shaped coupling section 32, lower surface in FIGS. 3 and 6, of which will be fixed to the magnetic head slider 12. Thus, a pair of movable arms 33 and 34 of the actuator run in parallel with each other keeping substantially perpendicular to the successive section 30, the base section 31 and the coupling section 32. Since the actuator portion is formed by bending at inside positions from the side end edges of the coupling section 32, each of the movable arms 33 and 34 is shaped in a strip-shaped plane plate. In order to obtain large stroke in response to a lower driving force, it is very important that the whole of each movable arm is formed in a plane plate shape.

In this embodiment, the base section 31 couples the movable arms 33 and 34 at a forward position from the successive section 30, and the coupling section 32 couples top end sections of these movable arms 33 and 34. The movable arms 33 and 34 are formed in parallel to side surfaces of the magnetic head slider 12, and the successive section 30, the base section 31 and the coupling section 32 are formed in parallel to a surface which is opposite to the ABS of the magnetic head slider 12.

The base section 31 has a shape such that a rectangular projection 35 is protruded frontward from the strip. In operation, the dimple 14a formed on the load beam 14 depress this projection 35 to apply a load to the slider. Thus, in this embodiment, the projection 35 has side edges 35a and 35b shaped in rounded or arc shaped sections so as to increase the strength of this projection 35 to endure the applied load. Namely, the load is applied to the projection 35 of the actuator 11 from the dimple 14a because in this embodiment the actuator is designed to have a function of a tongue of the flexure. However, since the actuator 11 and the flexure 13 are formed in unitary in this embodiment, it is impossible to thicken this projection 35 only. Therefore, to increase the rigidity of this projection 35, the frame of the actuator 11 is roundly bent so that each of the side edges 35a and 35b of the projection 35 has an arc shaped section.

The movable arm 33 consists of an arm member 33a, a piezoelectric element 33b formed on an outside surface of the arm member 33a, a signal terminal and a ground terminal of the piezoelectric element 33b. The movable arm 34 is configured similarly.

The signal terminals and the ground terminals of the piezoelectric elements are electrically connected respectively to actuator connection pads and to ground pads through a conductor sheet 36 a part of which is formed on or attached to inside surfaces of the movable arms of the actuator 11. The ground terminals may directly grounded to the respective arm members. The conductor sheet 36 includes three trace conductors, and actuator connection pads and to ground pads electrically connected to the three trace conductors. Four trace conductors and head element connection pads electrically connected to the four trace conductors may be formed on the conductor sheet 36, or on another individual conductor member.

The conductor sheet 36 may be formed by sequentially depositing a first insulation material layer made of a resin such as polyimide with a thickness of about 5 µm, a patterned Cu layer (trace conductor layer) with a thickness of about 4 µm, and a second insulation material layer made of a resin such as polyamide with a thickness of about 5 µm in this order.

This conductor sheet 36 is formed on a metal plate for the actuator and the flexure before bending it. When bending the metal plate, the conductor sheet 36 will follow without receiving unnecessary stress.

In this embodiment, the piezoelectric elements, the signal terminals and the ground terminals are formed on the outside surfaces of the arm members. Thus, the actuator connection pads and to the ground pads of the conductor sheet 36 which is formed on or attached to the inside surfaces of the arm members are revealed to the outsides of the arm members by bending the end sections of the conductor sheet 36. It is possible to form the piezoelectric elements, the signal terminals and the ground terminals on the inside surfaces of the arm member. The latter is preferable because a region for catching the actuator by a jig will increase.

The flexure 13, the successive section 30, the base section 31, the coupling section 32 and the arm members 33a and 34a are united by cutting and bending a single resilient metal plate such as a stainless steel plate for example. As for the metal plate, a resilient plate spring material such as a carbon steel plate, a copper alloy plate (for example a copper titanium plate, a phosphor bronze plate or a beryllium copper plate), or a titanium plate may be used other than an alloy steel plate such as the stainless steel plate. In case that the piezoelectric elements are formed by printing and sintering, a good heat resistance material should be used as the metal plate.

Figure 7:
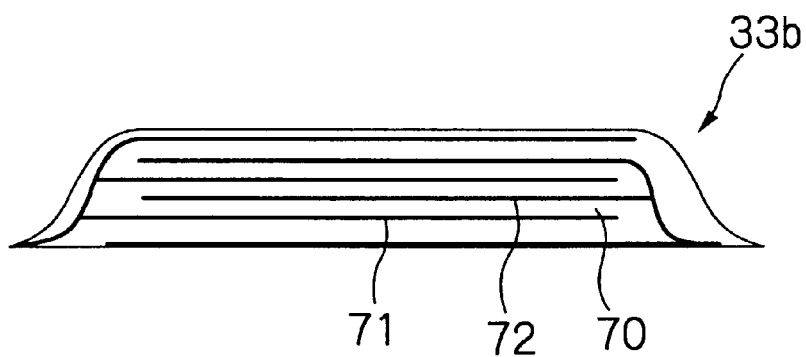
FIG. 7 is a sectional view illustrating a structure of a piezoelectric element section of the actuator in the embodiment of FIG. 1.

Each of the piezoelectric elements has, as shown in FIG. 7, a multi-layered structure of alternately laminating piezoelectric material layers 70, signal electrode layers 71 and ground (common) electrode layers 72. By applying voltage across the signal electrode layers 71 and the ground (common) layers 72, the piezoelectric material layers 70 expand and contract. The piezoelectric material layer 70 is made of material that expands and contracts by reverse piezoelectric effect or by electrostrictive effect. The signal electrode layers 71 are electrically connected to the signal terminal, and the ground electrode layers 72 are electrically connected to the ground terminal.

In case that the layers 70 are made of piezoelectric material such as PZT (Lead Zirconate Titanate Oxidization), these piezoelectric material layers are in general polarized so as to improve their displacement performance. The polarized direction is the lamination direction of the piezoelectric material layers 70. When voltage is applied across the electrode layers and the direction of the produced electrical field is the same as the polarized direction, the piezoelectric material layer between the electrode layers expands in its lamination direction (piezoelectric longitudinal effect) and contracts in its in-plane direction (piezoelectric lateral effect). Contrary to this, when the direction of the produced electrical field is in inverse as the polarized direction, the piezoelectric material layer between the electrode layers contracts in its lamination direction (piezoelectric longitudinal effect) and expands in its in-plane direction (piezoelectric lateral effect).

If the voltage with a polarity which will induce the contraction or expansion is applied to the piezoelectric element, the piezoelectric element contracts or expands in response to the applied voltage polarity and thus each of the movable arms 33 and 34 bends to trace a S-character resulting the top end section of the arm 33 or 34 to laterally and linearly displace. Thus, the magnetic head slider 12 fixed to the actuator 11 also laterally and linearly displaces. Since the slider displaces namely oscillates with linear motion not swinging or rotational motion, more precise positioning of the magnetic head element can be expected.

It is possible to apply voltages that induce mutually reverse motions may be simultaneously applied to the piezoelectric elements, respectively. In other words, AC voltages may be simultaneously applied to the piezoelectric elements so that one piezoelectric element expands when the other piezoelectric element contracts and vice versa. The oscillation of the movable arms is centered when no voltage is applied to the piezoelectric elements. However, one of the piezoelectric elements is expanded and therefore the direction of the driving voltage opposes to that of the polarization in the piezoelectric material layer. Thus, if the applied voltage is high or the voltage is continuously applied, attenuation in polarization of the piezoelectric material layer may occur. It is desired therefore that a constant DC bias voltage in the same direction as the polarization direction be additionally applied to the AC voltage to form the driving voltage so that the direction of the driving voltage never opposes to that of the polarization in the piezoelectric material layer. The oscillation of the movable arms is centered when only the bias voltage is applied to the piezoelectric elements.

In this specification, the piezoelectric material is material that expands or contracts by their reverse piezoelectric effect or electrostrictive effect. Any piezoelectric material applicable for the piezoelectric elements of the actuator can be used. However, for high rigidity, it is desired to use a ceramics piezoelectric material such as $PZT[Pb(Zr,Ti)O_3]$, $PT(PbTiO_3)$, $PLZT[(Pb,La)(Zr,Ti)O_3]$, or barium titanate $(BaTiO_3)$.

Each of the piezoelectric elements may have a single layer structure of alternately laminating a piezoelectric material layer, a signal electrode layer and a ground (common) electrode layer.

As aforementioned, in this embodiment, the frame of the actuator 11, made from a metal member and the flexure 13 made from a metal member are unitarily formed by a metal plate. Therefore, no process for partially fixing the actuator to the tongue of the flexure is necessary resulting a manufacturing process of an HGA can be simplified. It should be noted that, in this embodiment, the actuator itself shares the function of the tongue of the flexure.

The actuator 11 in this embodiment holds the magnetic head slider 12 by adhering its coupling section 32 to the surface opposite to the ABS of the slider 12 using a resin adhesive for example. Since the magnetic head slider 12 is fixed to the coupling section 32, fixing of the slider can be achieved with sufficient strength and a shock resistance against up-and-down movements can be greatly improved. Also, magnetic head sliders with different widths can be easily mounted to the actuator.

Because of a partial fixing of the magnetic head slider 12 to the coupling section 32 of the actuator 11, shape change in the ABS of the magnetic head slider 12 (generation of crown or camber) can be prevented from occurring even if the adhesive deforms due to change in atmosphere temperature. The fixing strength can be increased if the adhesive is also applied to the side surfaces of the magnetic head slider 12. In case of using a conductive adhesive, the body of the magnetic head slider 12 can be easily grounded through the actuator 11.

Via holes 32a formed through the coupling section 32 is utilized such that, when a UV (ultra violet) curing resin adhesive is used for fixing, a UV light for curing can be directly radiated to the adhesive. Also, a via hole 30a formed through the successive section 30, a via hole 31a formed through the base section 31 and the via hole 32a formed through the coupling section 32 may be utilized for positioning the actuator when fixing because coordinates of the actuator will be defined by a line between the centers of these via holes.

The height of the actuator 11 should be determined to be equal to or less than that of the magnetic head slider 12 so that the total height of the HGA will not increase even if the actuator is assembled in the HGA. In other words, the height of the actuator 11 can be increased to that of the magnetic head slider 12 so as to improve the strength of the actuator itself without increasing the total HGA height.

As aforementioned, since the successive section 30, the base section 31, the coupling section 32 and main portions of the movable arms 33 and 34 of the actuator 11 in this embodiment are made from a metal plate, the weight of the whole actuator can be reduced and thus a mechanical resonance frequency of the actuator can be increased. Also, as the basic member is formed by the metal plate that is strong and light-weighted, a shock resistance of the movable arms 33 and 34 which are particularly weaken for the shock can be greatly improved.

Due to the usage of the metal plate provided with a high mechanical strength, treatment of the actuator during assembling of the HGA becomes very easy. By using the metal plate to form the main portion of the actuator, the flexibility on a design of the actuator will improve with the shape and/or size. Thus, not only it is enabled to design the actuator with a sufficient stroke, but also it is possible to align the center of the magnetic head slider 12 and the load point or dimple position with the center of the actuator 11 resulting the flying performance of the magnetic head slider 12 to be extremely stabilized. Because the metal plate can be precisely machined, accuracy in size of the actuator 11 itself can be greatly improved.

Furthermore, since the actuator 11 in this embodiment holds the magnetic head slider 12 such that the slider 12 is mounted in a space between the movable arms 33 and 34, the thickness of the HGA around the magnetic head slider does not increase even if the actuator 11 is attached. Thus, no modifications in size of the magnetic disk drive apparatus due to the mounting of the actuator is necessary.

In addition, since the magnetic head slider 12 is caught in between the movable arms 33 and 34, the top end sections of the movable arms 33 and 34, which actually transfer the displacement to the slider 12, can be extended to always position at the top end of the slider 12. Thus, it is possible to provide a constant travel to the slider even if the size of the magnetic head slider 12 changes, and therefore an enough stroke of the magnetic head at the precise positioning operation can be always obtained.

A structure of the HGA according to the present invention is not limited to the aforementioned structure. Furthermore, although it is not shown, a head drive IC chip may be mounted on a middle of the suspension.

In the aforementioned embodiments, the precise positioning actuators for the thin-film magnetic head elements and the HGAs with the actuators are described. However, it is apparent that the present invention can be applied to a precise positioning actuator for a head element such as an optical head element other than the thin-film magnetic head element and an HGA with the actuator.

Many widely different embodiments of the present invention may be constructed without departing from the spirit and scope of the present invention. It should be understood that the present invention is not limited to the specific embodiments described in the specification, except as defined in the appended claims.

What is claimed is:

1. A head gimbal assembly including a head slider provided with at least one head element, a precise positioning actuator fixed to said head slider for precisely positioning said at least one head element, a flexure made of a metal plate member for supporting said actuator and a load beam fixed to and for supporting said flexure, said actuator comprising a pair of movable arms each formed by a metal plate that is substantially in parallel with a side surface of said head slider, top end sections of said pair of movable arms being capable of displacing in response to a drive signal applied to said actuator along a direction crossing planes of said metal plate, said flexure and said actuator being unitarily formed, a coupling section connected between said top end sections of said pair of movable arms and formed by a metal plate that is substantially in parallel with a one surface of said head slider, said one surface being opposite to an air bearing surface of said head slider, said one surface of said head slider being fixed to said coupling section, and a base section formed by a metal plate that is in parallel with said coupling section, said pair of movable arms extending forward from said base section, wherein said base section of said actuator comprises a strip and a projection protruded forward from the strip, a load being applied to said projection from said load beam.

2. The head gimbal assembly as claimed in claim 1, wherein said projection has side edges each having an arc shaped section.

3. The head gimbal assembly as claimed in claim 1, wherein said pair of movable arms, said coupling section, said base section and said projection of said actuator have a U-shaped section structure formed by bending a single metal plate.

4. The head gimbal assembly as claimed in claim 1, wherein each of said pair of movable arms of said actuator comprises an arm member made of the metal plate, and a piezoelectric element formed or adhered on a side surface of said arm member.

5. The head gimbal assembly as claimed in claim 4, wherein said piezoelectric element has a multi-layered structure of piezoelectric material layers and of electrode layers.

6. The head gimbal assembly as claimed in ciaim 4, wherein said piezoelectric element has a single layer structure of a piezoelectric material layer and of an electrode layer.

7. The head gimbal assembly as claimed in claim 1, wherein said metal plate is a stainless steel plate.

8. The head gimbal assembly as claimed in claim 1, wherein said at least one head element is at least one thin-film magnetic head element.

* * * * *